3,732,197
PRODUCTION OF α-OLEFIN POLYMERS
Sadao Kitagawa, Ami-machi, Japan, assignor to Mitsubishi Petrochemical Company Limited, Tokyo-to, Japan
No Drawing. Filed Dec. 7, 1970, Ser. No. 95,925
Claims priority, application Japan, Dec. 8, 1969, 44/98,524
Int. Cl. C08f 1/56, 3/10
U.S. Cl. 260—93.7     4 Claims

ABSTRACT OF THE DISCLOSURE

At least one kind of tropylium salt (cycloheptatrienium salt) in combined with a Ziegler-Natta type catalyst (comprising basically, a compound of a transition metal of Group IV, V, or VI and an organometallic compound of a metal of Group I, II, or III) to form a highly effective catalyst whereby at least one kine of α-olefin can be polymerized to produce α-olefin polymers of high crystallinity.

BACKGROUND OF THE INVENTION

This invention relates generally to olefin polymers and more particularly to a new and advanced process for producing α-olefin polymers of high crystallinity.

It is known in the art that, in the production of crystalline α-olefin polymers by polymerization of α-olefins, basic catalytic systems (so-called Ziegler-Natta catalysts) comprising combinations of compounds of transition metals of Groups IV, V, and VI of the periodic table and organometallic compounds of metals of Groups I, II, and III of the same table are effective. Representative examples of such catalytic systems are those which consist of titanium trichloride and trialkylaluminums, and titanium trichloride composite and dialkylaluminum halides.

Ordinarily, however, it is not possible with a catalytic system of this known character to satisfy both requirements of its activity (which can be compared in terms of the yields of the formed polymers) and stereospecific nature (which can be compared in terms of contents of crystalline polymers in total polymers formed).

For example, in case of propylene polymerization, while the aforementioned catalytic system in which a trialkylaluminum is used as a component of an organometallic compound is advantageous in its high activity, it has the disadvantage of low content (of the order of from 70 to 80 percent) of crystalline polymers in the polypropyllene formed. While the aforementioned catalytic system in which a dialkylaluminium halide is used has a much lower activity (of the order of ¼) than that of the above mentioned trialkylaluminum system, it has the advantage of a crystalline polymer content as high as approximately 90 percent.

While it is obvious that, in general, a combination of both high activity and excellent stereospecificity of the catalytic system is desirable, it may be considered to be a particularly important combination in gas-phase polymerization. The reason for this is that because the titanium trichloride-trialkylaluminum catalyst system having high activity is used in the case of gasphase polymerizations, the crystalline polymer content in the polymer formed is frequently low.

SUMMARY OF THE INVENTION

It is an object of the present invention to solve this problem and thereby to produce α-olefin polymers of high content of crystalline polymers without the accompaniment of a great lowering of the yield.

Another object of the invention is to solve the above mentioned problem through a relatively simple and low-cost process.

I have found that the foregoing and other objects of the invention can be achieved when at least one tropylium salt (alternative term: cycloheptatrienium salts) is combined with the Ziegler-Natta catalyst systems.

By the practice of the present invention in the case where the Ziegler-Natta catalyst to be combined with the tropylium salt is highly active and stereospecific, the stereospecificity thereof is improved, whereby the crystalline content of the polymer formed is increased. Furthermore, even when the Ziegler-Natta catalyst is highly active, this highly active characteristic can be further improved. Accordingly, this invention affords a great improvement in the extraction of non-crystalline polymers which has previously been disadvantageous in the cost of materials and power and in the process operation.

The nature, details, and utility of the invention will be more clearly apparent from the following detailed description beginning with general features of the invention and concluding with specific examples of practice illustrating preferred embodiments of the invention and reference examples.

DETAILED DESCRIPTION

The catalytic system in the production of α-olefin polymers according to the invention comprises, first, a Ziegler-Natta component. This component in turn, as is known, basically comprises a combination of a compound of a transition metal of Group IV, V, or VI and an organometallic compound of a metal of Group I, II, or III of the periodic table.

It has been found that, for the transition metal compound, compounds of titanium are preferable, and of these, titanium trichlorides of α, β, γ and δ types and compositions containing them which is for example, $TiCl_3/AlCl_3$ composition (3 $TiCl_3 \cdot AlCl_3$) and mixture of $TiCl_3$ with a metallic halide, are optimal. It is possible, of course, to use other compounds of titanium such as, for example, titanium tetrachloride and titanium tribromide, and compounds of transition metals other than titanium such as. for example, vanadium and zirconium.

It has been found further that, for the organometallic compound of a metal of Group I, II, or III, organoaluminum compounds are optimal. Specific examples of effective organoaluminum compounds are as follows.

(1) trialkylaluminums:
 trimethylaluminum
 triethylaluminum
 tri-n-propylaluminum
 triisopropylaluminum
 triisobutylaluminum
 tri-n-hexylaluminum
(2) dialkylaluminum halides:
 diethylaluminum chloride
 di-n-propylaluminum chloride
 diisobutylaluminum chloride
 diethylaluminum bromide
 diethylaluminum iodide
(3) dialkylaluminum hydrides:
 diethylaluminum hydride
 di-n-propylaluminum hyride
 diisobutylaluminum hydride It is known that various innovations can be applied to Ziegler-Natta catalysts composed basically of the above described two components (for example, adjustment of the conditions of the reduction or grinding of the maximum-valence titanium compound for preparing a low-valence titanium compound and addition or simultaneous use of auxiliary components such as electron-donor substances). It is possible in the practice of this invention also to carry out such innovations provided that the effect of the use of the tropylium salt is not impaired.

The unique and most important feature of this invention is the additional combining of a tropylium salt with the combination of the above described two components.

Tropylium salts and tropylium complexes are carbonium salts derived from cycloheptatrienes and, per se, are known compounds, being preparable by the following processes, for example.

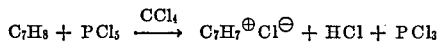

(Reference: Dokl.akad.Nauk, U.S.S.R., 113, 339 (1957))

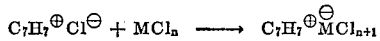

where:

MC $l_n$ is Lewis acid;
M represents Fe, Ti, P, Sb, As, Sn, etc.; and
$n$ represents the valence of M.

(Reference: J. Chem. Soc. 1961, 2320)

The positive charge of a tropylium cation does not exist on a limited number of carbon atoms but is in a delocalized state throughout the entire seven-membered ring. Accordingly, this cation is one having an aromatic conjugate (a non-benzenoid aromatic), differing from tropilidene (cycloheptatriene) which is a parent hydrocarbon thereof. For this reason, a tropylium halide, for example, is clearly different in its chemical properties from other hydrocarbon halides.

Specific examples of tropylium salts of this nature are as follows (the tropylium group being denoted by T).

$$T^{\oplus}Cl^{\ominus}, T^{\oplus}Br^{\ominus}, T^{\oplus}I^{\ominus}, T^{\oplus}I_3^{\ominus}, T^{\oplus}ClO_4^{\ominus}, T^{\oplus}BF_4^{\ominus}, T^{\oplus}BCl_4^{\ominus}$$

$$T^{\oplus}AlCl_4^{\ominus}, T^{\oplus}AlBr_4^{\ominus}, T^{\oplus}FeCl_4^{\ominus}, T^{\oplus}TiCl_5^{\ominus}, (T)_2^{2\oplus}GnCl_6^{2\ominus},$$

$$T^{\oplus}SbCl_6^{\ominus}, T^{\oplus}ZnCl_3^{\ominus}, T^{\oplus}PCl_6^{\ominus}, T^{\oplus}AsCl_6^{\ominus}, T^{\oplus}BiCl_6^{\ominus}$$

In addition to these salts in which the tropylium group is non-substituted, there are salts having tropylium groups substituted by halogens, alkyls (particularly lower alkyls), alkoxyls (particularly lower alkoxyls), and aryls (particularly phenyl) and benzo derivatives in which the benzene ring is condensed. Specific examples of substituted tropylium groups of this character are as follows.

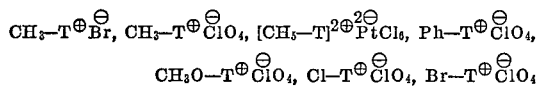

(where $CH_3$—T, $CH_3O$—T, ph—T, Cl—T, and Br—T respectively designate methyl-, methoxy-, phenyl-, chloro-, and bromo-substituted tropylium groups).

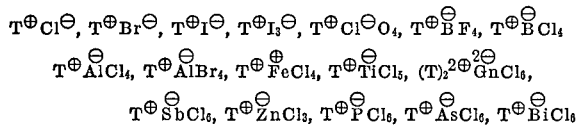

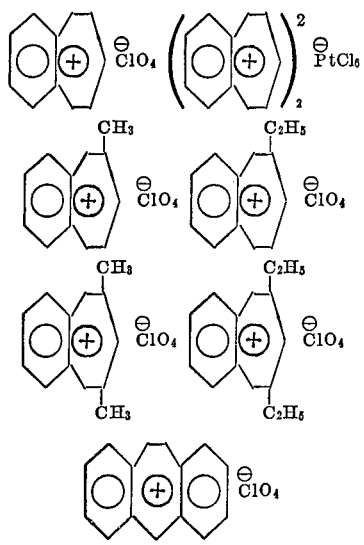

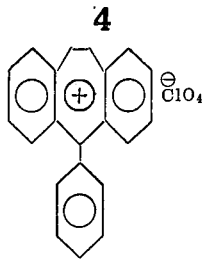

The catalytic system of this invention which is formed basically by combining the above described three indispensable components can be prepared by mixing these three components at one time or in staggered sequence in the presence or absence of an inert dispersant, preferably in an atmosphere of an inert gas. One example of mixing sequence is organoaluminum compound to titanium halide to tropylium salt. It is also possible to carry out an aging process such as that frequently carried out in the preparation of a Ziegler catalytic system, in general.

The proportions by molar ratio of these three components can be adjusted within the following ranges, for example to suit the objective process or product. A quantity of the tropylium salt which is from 0.001 to 10 times, preferably from 0.01 to 1.0 times, that of the titanium halide is suitable. If the quantity of the tropylium salt added is excessive, there will be the possibility of the polymerization being inhibited. The molar ratio of the organoaluminum compound to the titanium halide is, for example, from 0.5 to 50, preferably from 1 to 20.

Except for the use of a catlytic system of the above described character, the process for producing α-olefin polymers according to the invention does not differ essentially from those which can be resorted to, in general, in polymerization of this kind.

Accordingly, individual polymerization of α-olefins (e.g., ethylene, propylene, butene-1, and 4-methylpentene-1) or mutual copolymerization thereof or with other monomers copolymerizable therewith may be carried out in the presence or absence of an inert organic solvent such as a hydrocarbon (e.g., benzene, toluene, xylene, pentane, hexane, heptane, and cyclohexane) or a hydrocarbon halide (e.g., chlorobenzene), or with the liquid or liquified monomers for polymerization of the above mentioned α-olefins and other substances used as solvents or in gaseous phase without using any solvent, at a temperature in the range of the order of, for example, from 30 to 150 degrees C., preferably from 50 to 100 degrees C., and a pressure in the range of the order of from atmospheric pressure to 100 atmospheres, preferably from atmospheric pressure to 50 atmospheres. The present invention is particularly suitable for stereospecific polymerization.

In order to indicate still more fully the nature and utility of this invention, the following specific examples of practice consituting preferred embodiments of the invention, reference examples, and results are set forth, it being understood that these examples are presented as illustrative only, and that they are not intended to limit the scope of the invention.

The results of these examples are set forth in terms of the polymerization velocity or rate $v$ and isotactic index I.I. of each polymer formed as defined below.

$$v = \frac{W_p}{C_i \cdot t \cdot P_p}$$

where:

$W_p$ is the total weight grams (g.) of the polymers formed;
$C_i$ is the weight (g.) of titanium halide component used;
$t$ is the time (hours); and
$P_p$ is partial pressure (atmospheres) of propylene $$I.I. = \frac{\begin{pmatrix}\text{Weight (g.) of insoluble part} \\ \text{of boiling n-heptane}\end{pmatrix}}{W_p} \times 100$$

EXAMPLE 1

2-liter, four-necked flask provided with a reflux condenser, an agitator, a thermometer, and a propylene inlet was dried throughly, evacuated, and flushed with argon. One liter of purified heptane was then introduced into the flask, and, as the flask interior temperature was maintained at 65 degrees C., 0.834 grams (g.) of triethylaluminum, 0.278 g. of titanium trichloride (AA), and 0.062 g. of $C_7H_7^{\oplus}Cl^{\ominus}$ (molar ratio of 0.27 relative to titanium trichloride) were added in this order named to the process batch. Then propylene was blown into the flask. After 3 hours, 100 ml. of n-butanol was added to the process batch to stop the polymerization.

The resulting reaction mixture was filtered, whereupon 29.1 g. of a white solid polymer was obtained. In addition, 4.6 g. of an amorphous rubbery polymer was obtained by distilling off the solvent of the distillate.

The polymerization rate $v$ calculated from the sum of the quantities of these two polymers was 61.1. The white solid polymer was subjected to extraction with boiling n-heptane, and the isotactic index, I.I., calculated with consideration also of the quantity of the amorphous rubbery polymer, was found to be 84.3 percent.

EXAMPLES 2 THROUGH 10

By the procedure set forth in Example 1, polymerization of propylene was carried out for 3 hours under atmospheric pressure and at 65 degrees C. with the addition, in each case, of an organoaluminum compound and a tropylium salt as indicated in Table 1, in which the results are also set forth. In Table 1, the symbol T designates $C_7H_7$.

isotactic index was merely 77.2 percent, and the polymerization rate was 60.6.

EXAMPLE 11

A one-liter, stainless-steel autoclave provided with an electromagnetic-induction agitator and a temperature controller was charged with 20 g. of a dried polypropylene synthesized separately as a catalyst dispersion medium. The autoclave was then evacuated and flushed with argon several times.

Next, a slurry prepared by adding 0.20 g. of triethylaluminum, 10 mg. of titanium trichloride, and 1.6 mg. of $C_7H_7^{\oplus}Cl^{\ominus}$ in the sequence named to 10 ml. of heptane at room temperature was introduced into the autoclave, into which propylene gas was blown, and the interior temperature of the autoclave was rapidly raised to 85 degrees C. In this state of the polymerization system, it is substantially the same as that wherein a solvent is not used, and the propylene is in a gaseous state.

Propylene gas was continuouesly blown into the autoclave, and the process batch was caused to polymerize for 2 hours under a pressure of 35 kg./cm.$^2$, gauge, and a temperature of 85 degrees C. After 2 hours, the supplying of propylene was stopped, and the propylene gas remaining in the autoclave was purged. The autoclave was then opened, and a polypropylene in the form of a white powder in a loose state was taken out.

After drying, the weight of this polypropylene was measured and found to be 48.6 g. (after deduction of the weight of the polypropylene used as a dispersion medium). This polypropylene was subjected to 12 hours of extraction with boiling n-heptane (whereupon the iso-

TABLE 1

| Example | Titanium trichloride (g.) | Organic Al compound (g.) | Tropylium salt (g.) | White solid polymer (g.) | Polymer soluble in solvent (g.) | V | I.I. |
|---|---|---|---|---|---|---|---|
| 2 | 0.361 | AlEt$_3$, 1.08 | T$^{\oplus}$AlCl$_4^{\ominus}$, 0.17 | 27.6 | 3.8 | 43.6 | 85.3 |
| 3 | 0.285 | AlEt$_3$, 0.855 | T$^{\oplus}$B$^{\ominus}$Cl$_4$, 0.06 | 31.3 | 5.0 | 64.3 | 84.0 |
| 4 | 0.225 | AlEt$_3$, 0.675 | T$^{\oplus}$Cl$^{\ominus}$O$_4$, 0.06 | 22.4 | 3.5 | 57.7 | 84.2 |
| 5 | 0.378 | AlEt$_3$, 1.13 | T$^{\oplus}$Fe$^{\ominus}$Cl$_4$, 0.18 | 32.5 | 4.6 | 50.6 | 85.3 |
| 6 | 0.362 | AlEt$_3$, 1.09 | T$^{\oplus}$Sn$^{\ominus}$Cl$_5$, 0.19 | 27.8 | 3.3 | 43.6 | 87.8 |
| 7 | 0.255 | AlEt$_3$, 0.765 | T$^{\oplus}$Zn$^{\ominus}$Cl$_3$, 0.091 | 24.6 | 3.3 | 56.3 | 85.6 |
| 8 | 0.258 | AlEt$_3$, 0.774 | T$^{\oplus}$Sb$^{\ominus}$Cl$_6$, 0.14 | 27.3 | 2.9 | 59.5 | 88.6 |
| 9 | 0.325 | Et$_2$AlCl, 0.975 | T$^{\oplus}$Cl$^{\ominus}$, 0.059 | 15.6 | 0.6 | 25.3 | 95.5 |
| 10 | 0.339 | Et$_2$AlCl, 1.02 | T$^{\oplus}$Sb$^{\ominus}$Cl$_6$, 0.112 | 13.5 | 0.9 | 21.3 | 92.7 |

REFERENCE EXAMPLE 1

With the use of 1.01 g. of triethylaluminum and 0.335 g. of titanium trichloride, propylene was polymerized for 3 hours at 65 degrees C. by the procedure specified in Example 1.

As a result, 33.0 g. of a white solid polymer and 9.57 g. of an amorphous rubbery polymer were obtained. The isotactic index was only 74.9 percent. The polymerization rate was 64.6.

REFERENCE EXAMPLE 2

With the use of 0.904 g. of diethylaluminum chloride and 0.302 g. of titanium trichloride, propylene was polymerized for 3 hours at 65 degrees C. in accordance with the procedure of Example 1.

As a result, 12.0 g. of a white solid polymer and 1.2 g. of an amorphous rubbery polymer were obtained. The isotactic index was 90.0 percent, and the polymerization rate was 20.0.

REFERENCE EXAMPLE 3

With the use of 1.10 g. of triethylaluminum, 0.365 g. of titanium trichloride, and 0.64 g. of triphenylmethyl chloride, propylene was polymerized for 3 hours under atmospheric pressure and at 65 degrees C. by the procedures set forth in Example 1.

As a result, 35.1 g. of a white solid polymer and 8.5 g. of an amorphous rubbery polymer were obtained. The tactic index was found to be 88.2 percent (calculated as the I.I. of only the newly formed polypropylene, consideration being given to the I.I. of the polypropylene used as a dispersion medium).

EXAMPLE 12

With the use of 0.20 g. of triethylaluminum, 10 mg. of titanium chloride, and 3.1 mg. of

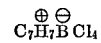

propylene was polymerized for 2 hours under a pressure of 35 kg./cm.$^2$, gauge, and at a temperature of 85 degrees C. by the procedure specified in Example 11.

As a result, 47.8 g. of a polymer in the form of a white powder was obtained. The I.I. was 87.0 percent.

EXAMPLE 13

Propylene was polymerized for 2 hours under a pressure of 35 kg./cm.$^2$, gauge, and at 85 degrees C. in accordance with the procedure of Example 11 except for the use of 5.5 mg. of

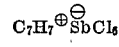

instead of

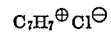

As a result, 45.0 g. of a polymer in the form of a white powder was obtained. The I.I. was 91.0 percent.

REFERENCE EXAMPLE 4

Propylene was polymerized for 2 hours under a pressure of 35 kg./cm.², gauge, and at 85 degrees C. by the procedure of Example 11 with the use of 0.2 g. of triethylaluminum and 10 mg. of titanium trichloride and without the addition of a tropylium salt to the catalyst system.

As a result, 50.0 g. of a polymer in the form of a white powder was obtained. The I.I. was 84.0 percent.

COMPARISON

The results of some of the foregoing reference examples and examples have been selected and set forth in Table 2 to indicate the effect of adding tropylium salts.

As is apparent from this Table 2, it is possible, by merely adding a minute quantity of a tropylium salt to a titanium trichloride/triethylaluminum system, to elevate the isotactic index to a value close to 90 percent with almost no lowering of the polymerization rate.

Furthermore, when a tropylium salt is added to a titanium trichloride/diethylaluminum chloride system, the I.I. is increased to a value as high as 95.5 percent.

It is also apparent from this comparison in Table 2 that the effect of tropylium halides differs remarkably from the effect of mere hydrocarbon halides. The reason for this is that tropylium cations belong to "non-benzenoid aromatics" and have chemical properties differing widely from those of simple hydrocarbon halides.

EXAMPLE 14

By the procedure of Example 11 except for the use of 5 mg. of $$C_7H_7^{\oplus}AlCl_4^{\ominus}$$

instead of $C_7H_7^{\oplus}Cl^{\ominus}$, propylene was polymerized for 2 hours under a pressure of 35 kg./cm.², gauge, and at 85 degrees C.

The results are indicated in Table 3 together with those of the following Examples 15 and 16 and Reference Example 5.

EXAMPLE 15

A solution previously prepared by mixing 0.1 g. of triethylaluminum, 5 mg. of $C_7H_7^{\oplus}AlCl_4^{\ominus}$, and 1 ml. of heptane and aging the resulting mixture for 24 hours at room temperature was introduced into the one-liter autoclave specified in Example 11 and containing 20 g. of a polypropylene. Then 1 ml. of a heptane slurry containing 10 mg. of titanium trichloride was added to the process batch, and thereafter propylene was polymerized in the autoclave for 2 hours under a pressure of 35 kg./cm.², gauge, and at 85 degrees C.

EXAMPLE 16

A one-liter autoclave as specified in Example 11 and containing 20 g. of a polypropylene was charged first with 1 ml. of a heptane solution containing 0.4 g. of di-n-propylaluminum chloride, and then 1 ml. of a heptane slurry containing 40 mg. of titanium trichloride and 7 mg. of $C_7H_7^{\oplus}AlCl_4^{\ominus}$ was added to the process batch. Propylene was then polymerized in the autoclave for 2 hours under a pressure of 35 kg./cm.², gauge, and at 85 degrees C.

REFERENCE EXAMPLE 5

Propylene was polymerized by the procedure and under the same conditions as those of Example 16 except that $C_7H_7^{\oplus}AlCl_4^{\ominus}$ was not used.

TABLE 3

| | Titanium trichloride (mg.) | Organic Al compound (g.) | $C_7H_7^{\oplus}AlCl_4^{\ominus}$ (mg.) | Propylene yield (g.) | I.I. (percent) |
|---|---|---|---|---|---|
| Example: | | | | | |
| 14 | 10 | AlEt₃, 0.1 | 5 | 60.0 | 91.5 |
| 15 | 10 | AlEt₃, 0.1 | 5 | 80.4 | 88.8 |
| 16 | 40 | (n-Propyl)₂AlCl, 0.4 | 7 | 51.0 | 99.5 |
| Reference Example 5 | 40 | (n-Propyl)₂AlCl, 0.4 | | 48.0 | 93.4 |

I claim:

1. A process for producing α-olefin polymers of high crystallinity which comprises polymerizing at least one α-olefin by causing said α-olefin to contact a catalyst comprising a titanium compound, an organoaluminum compound selected from the group consisting of trialkylaluminum, dialkylaluminum halide and dialkylaluminum hydride and at least one tropylium salt, the mole ratio of said organoaluminum compound to said titanium compound being from about 0.5 to about 50 and the mole

TABLE 2

| Catalyst system, added quantity (g.) | Temp. (° C.) | Time (hr.) | Pressure | V | I.I. (Percent) |
|---|---|---|---|---|---|
| Reference: | | | | | |
| Example: | | | | | |
| 1 | TiCl₃, 0.335; Et₃Al, 1.01 | 65 | 3 | Atm. | 64.6 | 74.5 |
| 2 | TiCl₃, 0.302; Et₂AlCl, 0.904 | 65 | 3 | Atm. | 22.0 | 90.0 |
| 3 | TiCl₃, 0.365; Et₃Al, 1.10; (C₆H₅)₃CCl 0.64 | 65 | 3 | Atm. | 60.6 | 71.2 |
| Example: | | | | | |
| 1 | TiCl₃ 0.278; Et₃Al, 0.834; C₇H₇⊕Cl⊖ 0.062 | 65 | 3 | Atm. | 61.1 | 84.3 |
| 8 | TiCl₃, 0.258; Et₃Al, 0.774; C₇H₇⊖–Sb⊖Cl₆, 0.14 | 65 | 3 | Atm. | 59.5 | 88.6 |
| 9 | TiCl₃, 0.325; Et₂AlCl, 0.975; C₇H₇⊕Cl⊖, 0-059 | 65 | 3 | Atm. | 25.3 | 95.5 | ratio of said tropylium salt to said titanium compound being from about 0.001 to about 10.

2. A process for producing α-olefin polymers according to claim 1 in which: said titanium compound is a member selected from the group consisting of titanium trichlorides of α, β, γ and δ types, titanium tetrachloride, titanium tribromide and 3TiCl₃.AlCl₃; said organoaluminum compound is a member selected from the group consisting of trialkylaluminums, dialkylaluminum halides, and dialkylaluminum hydrides; and said tropylium salt is a member selected from the group consisting of $T^{\oplus}Cl^{\ominus}$, $T^{\oplus}Br^{\ominus}$, $T^{\oplus}I^{\ominus}$, $T^{\oplus}I_3^{\ominus}$, $T^{\oplus}ClO_4^{\ominus}$, $T^{\oplus}BF_4^{\ominus}$, $T^{\oplus}BCl_4^{\ominus}$, $T^{\oplus}Al^{\ominus}Cl_4$, $T^{\oplus}Al^{\ominus}Br_4$, $T^{\oplus}Fe^{\ominus}Cl_4$, $T^{\oplus}Ti^{\ominus}Cl_5$, $(T)_2^{\oplus 2}S_2^{\ominus}SnCl_6$, $T^{\oplus}Sb^{\ominus}Cl_6$, $T^{\oplus}Zn^{\ominus}Cl_3$, $T^{\oplus}P^{\ominus}Cl_6$, $T^{\oplus}As^{\ominus}Cl_6$, and $T^{\oplus}Bi^{\ominus}Cl_6$ and from the group consisting of $CH_3-T^{\oplus}Br^{\ominus}$, $CH_3-T^{\oplus}ClO_4^{\ominus}$, [$CH_3-T$]$^{\oplus 2\ominus 2}PtCl_6$, $Ph-T^{\oplus}ClO_4$, $CH_3O-T^{\oplus}ClO_4$, $Cl-T^{\oplus}ClO_4$, and $Br-T^{\oplus}ClO_4$, where T designates a tropylium group, and $CH_3-T$, $CH_3O-T$, $Ph-T$, $Cl-T$, and $Br-T$ respectively designate methyl-, methoxy-, phenyl-, chloro-, and bromo-substituted tropylium groups.

3. A process for producing α-olefin polymers according to claim 2 in which the molar ratio of the tropylium salt to the titanium compound is from 0.01 to 1.0, and the molar ratio of the organoaluminum compound to the titanium compound is from 1 to 20.

4. A process for producing α-olefin polymers according to claim 3 in which said at least one α-olefin is polymerized at a temperature of the order of from 50 to 100 degrees C. and under a pressure of the order of from atmospheric pressure to 50 atmospheres, gauge.

References Cited

UNITED STATES PATENTS 3,340,244  9/1967  Coover et al. _____ 260—93.7

JOSEPH L. SCHOFER, Primary Examiner

E. J. SMITH, Assistant Examiner

U.S. Cl. X.R.

252—429 B, 429 C; 260—88.2 B, 94.9 C, 94.9 E